US012622841B2

(12) United States Patent
Stephenson

(10) Patent No.: US 12,622,841 B2
(45) Date of Patent: May 12, 2026

(54) FINGER SLEEVE FOR SEXUAL STIMULATION

(71) Applicant: Amy Elizabeth Stephenson, Perris, CA (US)

(72) Inventor: Amy Elizabeth Stephenson, Perris, CA (US)

( * ) Notice: Subject to any disclaimer, the term of this patent is extended or adjusted under 35 U.S.C. 154(b) by 1066 days.

(21) Appl. No.: 17/670,425

(22) Filed: Feb. 12, 2022

(65) Prior Publication Data

US 2022/0265505 A1 Aug. 25, 2022

Related U.S. Application Data

(60) Provisional application No. 63/149,176, filed on Feb. 12, 2021.

(51) Int. Cl.
*A61H 23/00* (2006.01)
*A61H 19/00* (2006.01)

(52) U.S. Cl.
CPC ............. *A61H 19/40* (2013.01); *A61H 23/00* (2013.01); *A61H 2201/0153* (2013.01); *A61H 2201/0207* (2013.01); *A61H 2201/1635* (2013.01); *A61H 2201/165* (2013.01); *A61H 2201/1692* (2013.01)

(58) Field of Classification Search
CPC ...... A61H 2201/1692; A61H 2201/169; A61H 2201/1647; A61H 2201/1638; A61H 2201/165; A61H 2201/1635; A61F 13/105; A61F 13/10; A41D 13/087; A41D 31/18; A41D 2400/322; A61B 42/00; A61B 42/20
USPC ............................................................ 600/38
See application file for complete search history.

(56) References Cited

U.S. PATENT DOCUMENTS

| | | | | |
|---|---|---|---|---|
| 2,157,293 | A * | 5/1939 | Lenta | A61F 13/105 2/21 |
| 2,232,396 | A * | 2/1941 | Lee | A61F 13/105 2/21 |
| 2,409,101 | A * | 10/1946 | Brittingham | A01B 1/00 2/21 |
| 2,925,605 | A * | 2/1960 | Wheeler | A61F 13/105 2/21 |
| 3,348,541 | A * | 10/1967 | Loebeck | A61F 13/105 2/21 |
| 3,927,595 | A * | 12/1975 | Ferguson | A41D 13/087 84/322 |
| 4,127,222 | A * | 11/1978 | Adams | D05B 91/04 2/21 |
| 4,694,843 | A * | 9/1987 | Casenhiser | A45D 29/00 2/21 |
| 4,733,410 | A * | 3/1988 | Glotkin | A61B 42/00 2/21 |
| 12,089,671 | B1 * | 9/2024 | Williams | A41D 19/002 |
| 2007/0118947 | A1 * | 5/2007 | Lorenzo | B42D 9/04 2/21 |

(Continued)

FOREIGN PATENT DOCUMENTS

| | | | |
|---|---|---|---|
| CN | 2759457 | Y * | 2/2006 |
| CN | 2829712 | Y * | 10/2006 |

(Continued)

*Primary Examiner* — Brian L Casler

(57) ABSTRACT

A finger sleeve for use a sexual stimulation device includes an elongated body having a distal portion including a cavity configured to accept a fingernail of a user.

20 Claims, 4 Drawing Sheets

(56) References Cited

U.S. PATENT DOCUMENTS

| | | | | |
|---|---|---|---|---|
| 2011/0067707 | A1* | 3/2011 | Hui | A61F 6/04 128/844 |
| 2012/0116273 | A1* | 5/2012 | Nan | A61H 23/0263 601/46 |
| 2012/0325222 | A1* | 12/2012 | Carr | A61F 6/04 128/844 |
| 2014/0066925 | A1* | 3/2014 | Howard | A61H 23/00 606/38 |
| 2018/0116904 | A1* | 5/2018 | Lieberman | A61H 19/34 |
| 2019/0133217 | A1* | 5/2019 | Ramirez | A41D 13/0015 |
| 2023/0127737 | A1* | 4/2023 | Raccah | A61H 23/02 600/38 |
| 2023/0284765 | A1* | 9/2023 | Times | A45D 31/00 |

FOREIGN PATENT DOCUMENTS

| | | | | | |
|---|---|---|---|---|---|
| CN | 2907651 | Y | * | 6/2007 | |
| CN | 215651246 | U | * | 1/2022 | |
| DE | 102020125898 | A1 | * | 4/2022 | |
| GB | 2457779 | A | * | 9/2009 | A61H 19/40 |
| KR | 20160125345 | A | * | 10/2016 | |
| KR | 20210051257 | A | * | 2/2021 | |
| WO | WO-2010058872 | A1 | * | 5/2010 | A41D 13/087 |

* cited by examiner

FINGER SLEEVE FOR SEXUAL STIMULATION

FIELD OF THE INVENTION

The present invention relates to a sexual stimulation aid in the form of a finger sleeve.

BACKGROUND OF THE INVENTION

Throughout history, fingernails have been adorned, painted, and grown to lengths in an effort to enhance beauty or show status. Some people enjoy having long natural fingernails and others prefer wearing artificial nails. Noblewomen of the Ming Dynasty of China wore very long artificial nails as a status symbol indicating that they did not have to do manual labor. In the early 1800s, upper-class women of Greece often wore empty pistachio shells over their nails. Additionally, ancient Egyptian women wore nail extensions from materials that were luxuries and available only to the wealthy, such as bone, ivory and gold.

However, long natural fingernails as well as long artificial nails are not conducive to sexual penetration during masturbation or digital stimulation with a partner. Body orifices such as a vagina and anus include sensitive body tissues that may be damaged by long fingernails, natural or artificial. Furthermore, accidents may occur that lead to a portion of a fingernail to be dislodged inside of a body orifice. A need exists for body-safe finger sleeves to provide a setting that allows for sexual penetration and can accommodate fingernails that protrude over the forward edge of fingertips.

Presently, there is no solution to sexual penetration with a finger having a fingernail protruding over the forward edge of the fingertip.

The present disclosure seeks to provide a solution to the above mentioned problems by providing a finger sleeve with an internal fingernail holding cavity that allows for sexual penetration with a finger having a fingernail protruding over the forward edge of the fingertip by a user.

SUMMARY OF THE INVENTION

In one aspect of the disclosure, a finger sleeve includes a canal for holding a finger, the canal includes an opening at one end. The finger sleeve also includes a solid barrier located at a second end of the canal. A fingernail cavity extends over the solid barrier and is configured to hold a fingernail of a user. The solid barrier includes one or more arches and is configured to contact the tip of the finger. The finger sleeve can also include an external layer surrounding the canal, solid barrier, and fingernail cavity. The finger sleeve can also have one or more protrusions, textures, or perforations on the external layer. In some embodiments, the canal, solid barrier, and fingernail cavity are formed of silicone. In some embodiments, the canal is configured to grip the finger so as to remain stationary during movement of sexual penetration. In some embodiments, the finger sleeve is clear, colored, or glow in the dark.

In another aspect of the disclosure, a sexual aid device includes an elongated body having an outer surface, a proximal end, a distal end, and a longitudinal axis extending from the proximal end to the distal end. The device can include an opening at the proximal end configured to accept a user's finger. An abutment can be positioned within the elongated body configured to abut a tip of the user's finger. The device can include a recess configured to receive a fingernail of the user, the recess being offset from the longitudinal axis and extending over the abutment. The sexual aid device of claim can include one or more projections, protrusions, knobs, bumps, rings, perforations, recesses, or textures. A diameter of the elongated body can be in the range of 1 cm to 3 cm. In some embodiments, the elongated body can have a length from the proximal end to the distal end in a range of 5 cm-15 cm. In some embodiments, the recess can include a length of 1 cm to 4 cm. In some embodiments, the device can include a power source and a switch to control a stimulation element. The stimulation element can include one of a vibratory device, a heat generating device, or a sound output device. In some embodiments, the outer surface of the elongated body can include a first diameter at one location and a second diameter at a second location, the second diameter being different than the first diameter. In some embodiments, the elongated body can be formed of silicone. In some embodiments, the elongated body can be flexible, while in others it can include a first flexible portion and a second rigid portion.

In another aspect of the disclosure, a method of sexual penetration can include inserting a finger into a sleeve having a canal for holding the finger. The method may include contacting a barrier with the tip of the finger and placing a fingernail protruding beyond the tip of the finger in a fingernail recess and inserting the sleeve into a body orifice.

BRIEF DESCRIPTION OF THE DRAWINGS

The invention will be more fully understood from the following detailed description taken in conjunction with the accompanying drawings, in which.

DETAILED DESCRIPTION

Figure 1A:
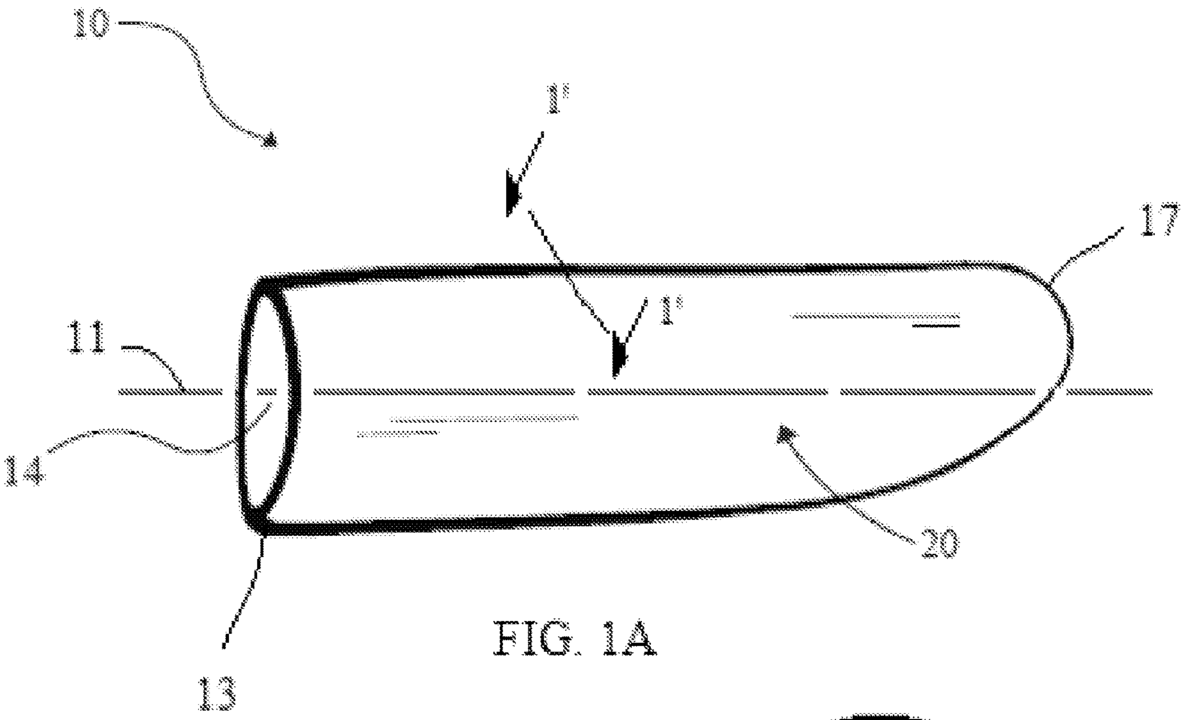
FIG. 1A is a side view of the finger sleeve with specific reference to the exterior, which allows for sexual penetration.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present disclosure sets forth a finger sleeve with an internal fingernail holding cavity that allows for sexual penetration with a finger having a fingernail protruding over the forward edge of the fingertip by a user. The head of the finger sleeve has an internal cavity that accommodates a protruding fingernail. A barrier exists that surrounds the internal fingernail holding cavity and sustains the figure of the finger sleeve. These parts are encased by an external layer that provides a setting for sexual penetration.

Preferably, the finger sleeve is made out of silicone. The intent of this aspect is, but not by way of limitation: so that the finger sleeve remains sturdy, yet flexible for movement during sexual penetration, while resisting abrasion from a protruding fingernail; so the antimicrobial effect of silicone allows for cleaning with minimal effort from a user and promotes reusing of finger sleeves which is sustainable to the environment and practical to consumers; with respect to silicone being hypoallergenic, the type of material used to make the finger sleeve does not restrict users who are sensitive to allergic reactions. Another preference is that the finger sleeve be produced with internal fingernail holding cavities of various shapes and sizes. The intent of this aspect is for the finger sleeve to be extremely compatible to users, allowing a finger sleeve to be worn with an fingernail cavity length and shape most similar to the length and shape of the user's fingernail as well as the finger canal to fit snug and grip around the user's finger, for best use of the device.

Referring to the drawings, there is shown a finger sleeve 10. The finger sleeve 10 includes an elongated body having a proximal end 13, a distal end 17, and a longitudinal axis 11 extending therebetween. The finger sleeve 10 may include a circular cross-section and can include an outer diameter in the range of approximately 1 to 3 cm. In other embodiments, the finger sleeve 10 may have a cross-sectional shape other than circular, for example oval, triangular, diamond, heart-shaped, square, and rectangular. The overall length of the finger sleeve 10 can be in the range of approximately 5 cm to 15 cm. The proximal end 13 includes an opening 14 configured to receive a finger of a user. The distal end 17 includes a bulbous or rounded shape to allow the sleeve 10 to easily be inserted into a body orifice such as a vagina, anus, or mouth. The finger sleeve 10 also includes a finger canal 12, a barrier 16, a fingernail cavity 18, and an external layer 20. In some embodiments, the components of the finger sleeve 10 can be formed individually and then attached together to form an integral unit. In other embodiments, each of the elements of the finger sleeve 10 can be made as a single unit, for example the sleeve 10 can be made by injection molding.

Figure 1B:
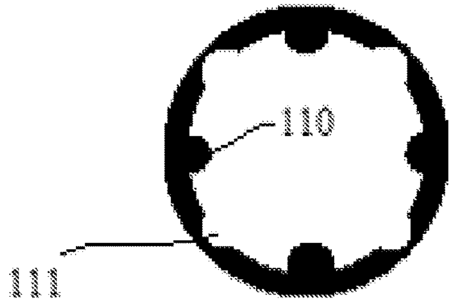
FIG. 1B is a cross-section taken along line 1'-1' in FIG. 1A.
Figure 2:
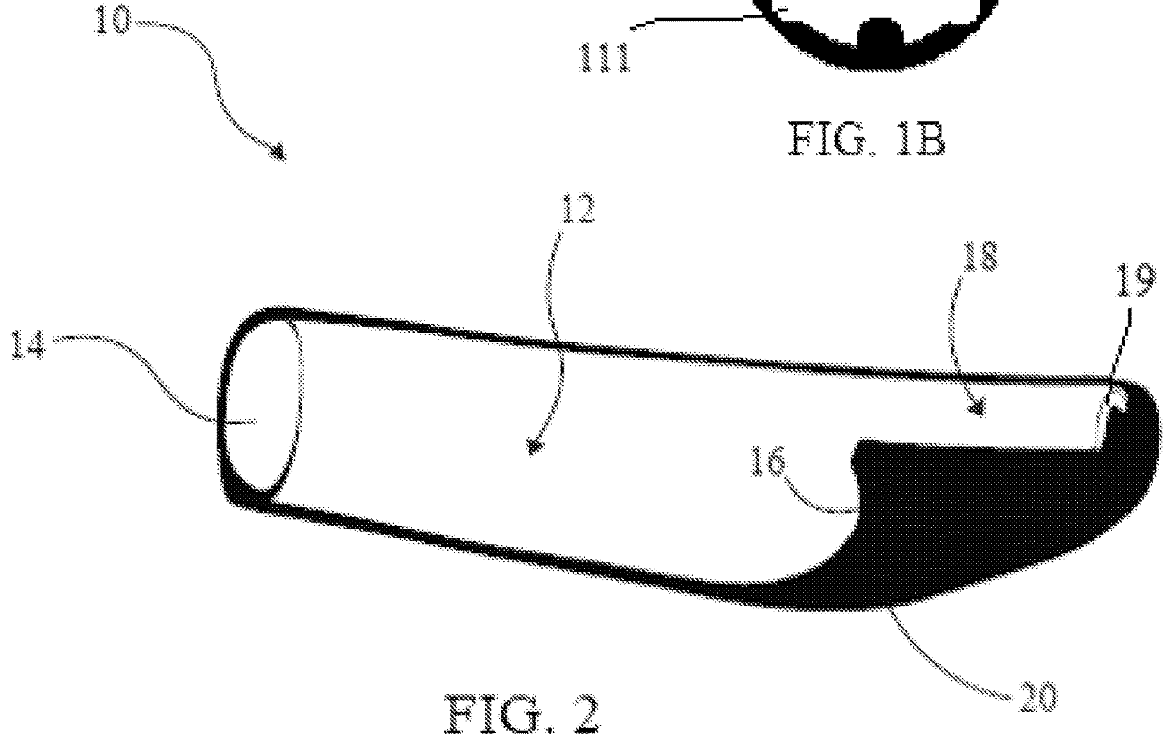
FIG. 2 is a side view of the finger sleeve with respect to interior components, which accommodate fingernails that protrude over the edge of fingertips.
Figure 3:
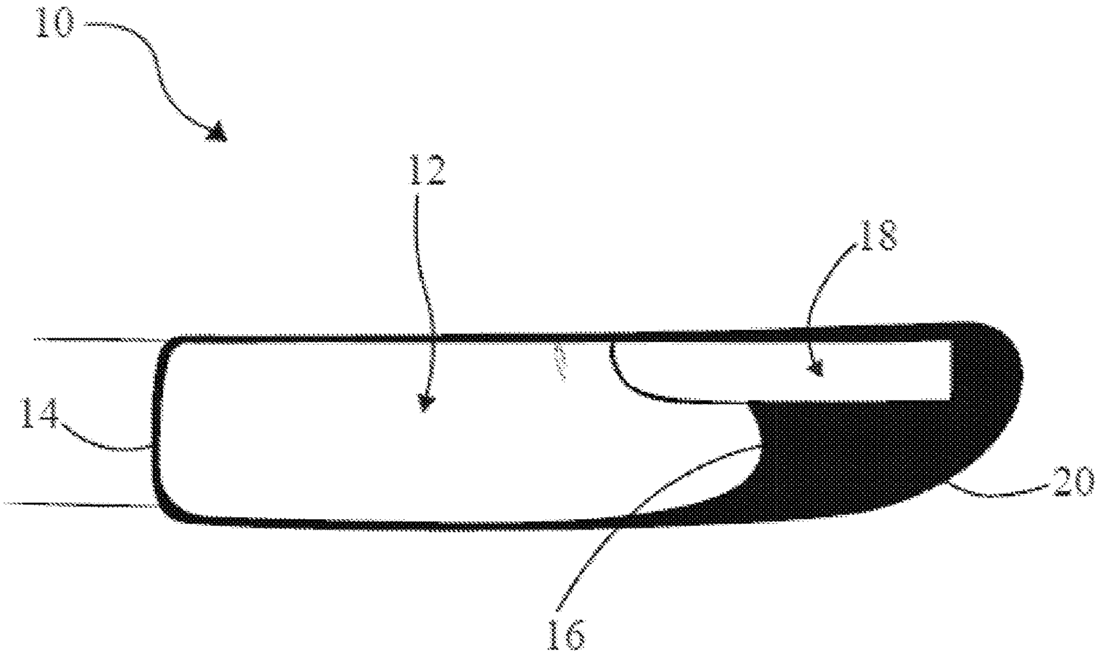
FIG. 3 is a side view of the finger sleeve fitted onto a user's finger having a protruding fingernail.

The finger canal 12 is configured for holding a finger and extends from the opening 14 to the barrier 16. The finger canal 12 preferably holds a user's finger in a gripping fashion so the finger sleeve 10 remains stationary on a user's finger during movement of sexual penetration. The finger sleeve 10 may include one or more structures that can aid in the gripping of a finger inserted into the canal 12 or to achieve a desired rigidity of the finger sleeve 10. For example, as shown in FIG. 1B, the finger sleeve 10 can include one or more ridges 110 that extend from the proximal end 13 to the distal end 17 along the inner surface of the canal 12. While these ridges are shown as having a dome-shaped cross-section, the ridges could also have a triangular, rectangular, or circular cross-section. The one or more ridges 110 may also only extend along a portion of the finger sleeve 10. Additionally, while the one or more ridges 110 are shown equally spaced around the inside diameter of the finger canal 12, the one or more ridges 110 can be spaced along one surface is so desired.

The finger sleeve 10 may also include one or more recesses 111 in the wall of the finger canal 12 as shown in FIG. 1B. The one or more recesses 111 may extending along the longitudinal axis from the proximal end 13 to the distal end 17, or only a portion thereof. The size and shape of the one or more recesses 111 may vary from one to another to achieve a desired flexibility or rigidity of the finger sleeve 10. In some embodiments, the grooves or recesses may be perpendicular to the longitudinal axis 11, and may be configured as rings along the inner surface of finger canal 12. This configuration may allow for greater bending of the sleeve 10 at desired locations.

At the proximal end 13 of the finger canal 12 there is an opening 14 where a user's finger can be easily inserted and removed from the finger sleeve 10. At the head of the finger canal 12 there is preferably a barrier 16 that meets the tip of a user's finger to confine the user's finger inside the finger canal 12 during movement of sexual penetration. The fingernail cavity 18 extends from the finger canal 12 so the user's finger can be properly held in the finger canal 12 whilst having a protruding fingernail.

The opening 14 is for the entry and exit of the finger sleeve 10 for a user's finger. The finger canal 12 and the external layer 20 form the opening 14 which preferably meshes to a user's finger so that when worn by a user, the transition from the finger sleeve 10 to the user's finger is not noticeable during sexual penetration. In some embodiments, the external layer 20 forms the wall of the finger canal 12. In other embodiments, the external layer 20 may be an additional layer of material surrounding the outside of the finger canal 12.

The barrier 16 of the finger sleeve 10 is shown to have arches, or a dome-shaped surface, so that the barrier 16 supports the structure of the finger canal 12 and the fingernail cavity 18. The barrier 16 is an abutment for the fingertip, and is integral to the shape and size of the fingernail cavity 18. The barrier 16 is preferably solid so that the figure of the head of the finger sleeve 10 is sustained when impacted by movement of sexual penetration. The tip of a finger inserted in the finger canal 12 can contact the arched surface of the barrier 16 and cannot extend beyond barrier 16.

The fingernail cavity 18 is configured for holding a fingernail. The fingernail cavity 18 is configured to encase and enclose any fingernail extending beyond the tip of the finger. This can include artificial as well as natural fingernails. The fingernail cavity 18 is parallel to the longitudinal axis 11 of the finger sleeve 10, but is offset from the longitudinal axis 11. The fingernail cavity 18 is positioned above the barrier 16. The length of the fingernail cavity 18 can be in the range of approximately 1 cm to 4 cm. The width of the fingernail cavity can be in the range of approximately 0.5 cm to 2 cm. The height of the fingernail cavity 18 can be in the range of approximately 0.1 cm to 0.5 cm tall. The barrier 16 and the external layer 20 structure the fingernail cavity 18 so that a user's fingernail is confined to the fingernail cavity 18. The fingernail cavity 18 is extended from the finger canal 12 so that the finger sleeve 10 can accommodate a fingernail protruding over the forward edge of a fingertip by a user. The fingernail cavity 18 surrounds the fingernail on all sides.

The external layer 20 is for encasing components of the finger sleeve 10. The external layer 20 provides a setting that is desired for sexual penetration with a finger sleeve 10 worn on a user's finger. It is feasible that the external layer 20 has perforations, textures, and protrusions that may be preferred by users. As discussed above, the external layer 20 can form the outer surface of the finger sleeve 10 and therefore define the finger canal 12 and shape of the distal tip 17, or the external layer 20 can be a separate layer placed over the components of the finger sleeve 10. In some embodiments, the material forming the external layer 20 can be the same as the material forming the remaining components of the finger sleeve 10. In other embodiments, the finger canal 12, barrier 16, fingernail cavity 18 can be formed of a first material, and the external layer 20 can be formed of a second material different from the first material.

Figure 5:
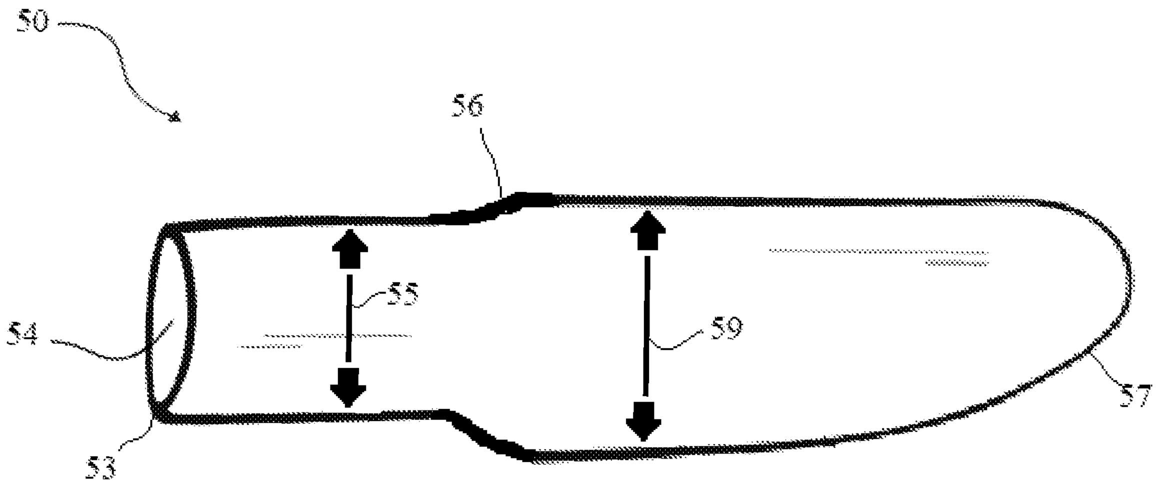
FIG. 5 is a side view of a finger sleeve in accordance with another embodiment having a distal portion of increased diameter.

The device is intended to be manufactured in clear, colored, and glow in the dark form. The device may be manufactured with different strengths of silicone. Using different polymers or silicones in the manufacturing of the finger sleeve 10 can allow for portions having a first flexibility and portions having a second flexibility that is different from the first flexibility. Alternatively, flexibility of the sleeve can be varied by modifying the diameter of the sleeve along a length thereof. FIG. 5 illustrates an embodiment of a finger sleeve 50 that can have a first flexibility at a first location of reduced diameter 55 and a second flexibility at an increased diameter portion 59. The portion having a reduced diameter 55 may extend from the proximal end 53 to a transition zone 56. The portion having an increased diameter 59 can extend from the transition zone 56 to the distal end 57. Finger sleeve 50 includes an opening 54 at the proximal end 53 to receive a user's finger, and a rounded distal tip 57. Finger sleeve 50 also includes a barrier or abutment (not shown) and a fingernail cavity (not shown) substantially similar to the fingernail cavity 18 described above.

Figure 6:
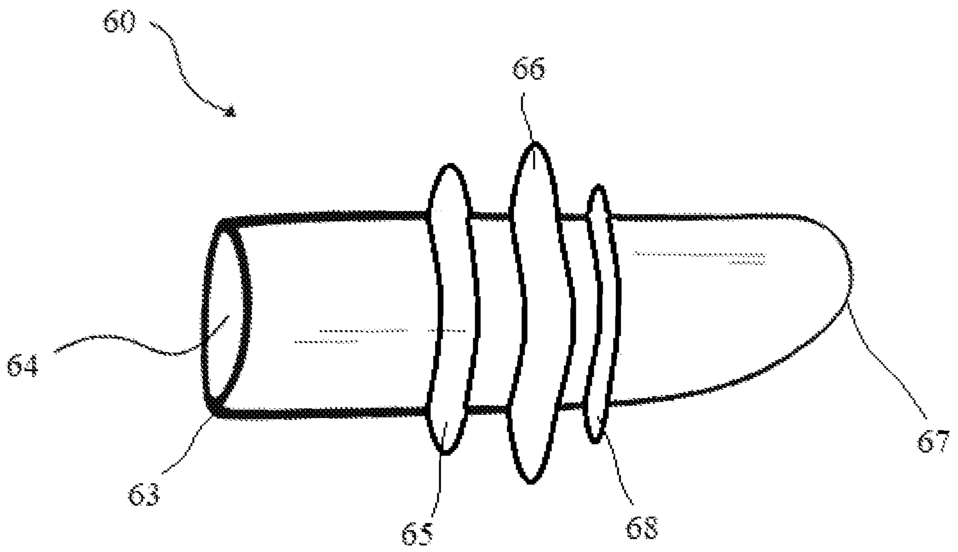
FIG. 6 is a side view of a finger sleeve in accordance with another embodiment having a plurality of enlarged diameter portions.

FIG. 6 illustrates another embodiment of a finger sleeve 60 having a plurality of different diameters between the proximal end 63 and the distal end 67. Three ring-shaped portions 65, 66, 68 have three different outer diameters and can be configured such that the outer surface of the ring-shaped portions 65, 66, 68 stimulate body orifice tissue as it is inserted and withdrawn from the body orifice. While the ring-shaped portions 65, 66, 68 are shown having different outer diameters, they can be configured to include the same outer diameter. Additionally, more or less than three ring-shaped portions can be placed at any portion of the finger sleeve 60 between the proximal end 63 and the distal end 67. Finger sleeve 60 includes an opening 64 at the proximal end 53 to receive a user's finger, and a rounded distal tip 67. Finger sleeve 60 also includes a barrier or abutment (not shown) and a fingernail cavity (not shown) substantially similar to the fingernail cavity 18 described above.

Figure 4:
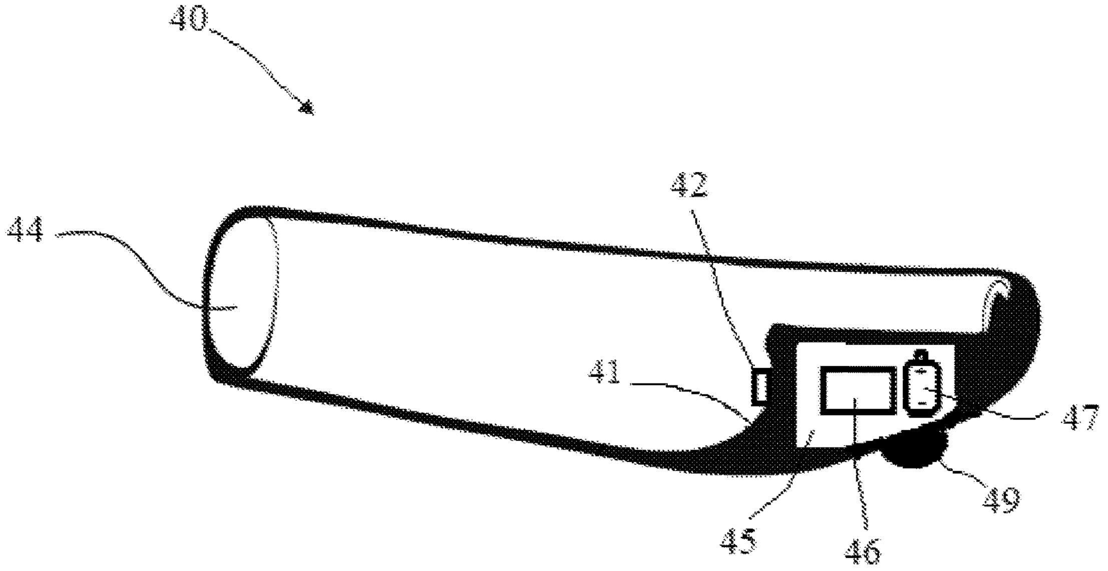
FIG. 4 is a side view of a finger sleeve in accordance with another embodiment having a vibratory mechanism.

FIG. 4 illustrates an embodiment of a finger sleeve 40 having a power source 47 and a stimulation element 46. The stimulation element 46 can include a vibratory device, a heat generating device, or a sound output device. An on/off switch 42 may be poisoned on the barrier 41 to allow a user to control the stimulation element 46 with the tip of their finger. In this embodiment, the barrier 41 includes a hollow cavity 45 in which the stimulation element 46 and the power source 47 are positioned. The finger sleeve 40 may also include one or more raised portions or protuberances 49 to amplify the stimulation provided by the stimulation element 46. Finger sleeve 40 includes an opening 44 at the proximal end to receive a user's finger, and a rounded distal tip. Finger sleeve 40 also includes a fingernail cavity (not shown) substantially similar to the fingernail cavity 18 described above. Each of the embodiments discussed herein can include a stimulation element, power source, and switch as discussed above.

Figure 7:
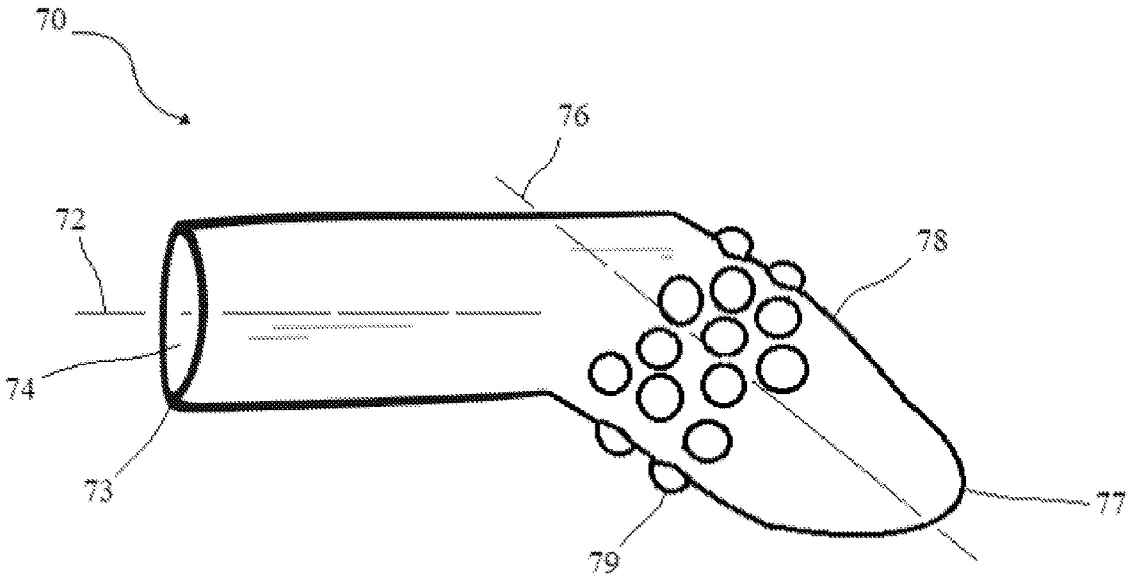
FIG. 7 is a side view of a finger sleeve in accordance with another embodiment having an offset distal portion.

FIG. 7 illustrates an embodiment of a finger sleeve 70 having a proximal portion 73 having a longitudinal axis 72 and a distal portion 78 having a longitudinal axis 76. The proximal portion 73 includes an opening 74 to receive a finger. In this embodiment, the longitudinal axis 72 of the proximal portion 73 is at an angle relative to the longitudinal axis 76 of the distal portion 78. The distal portion 78 may include a plurality of bumps or other raised features 79 to increase the stimulation of the body tissue. The proximal portion 73 may be made of a first rigid material, such as glass or Pyrex, while the distal portion 78 can be formed of a more flexible material such as silicone or other polymers. Finger sleeve 70 includes a rounded distal tip 77. Finger sleeve 70 also includes a barrier or abutment (not shown) and a fingernail cavity (not shown) substantially similar to the fingernail cavity 18 described above.

Figure 8:
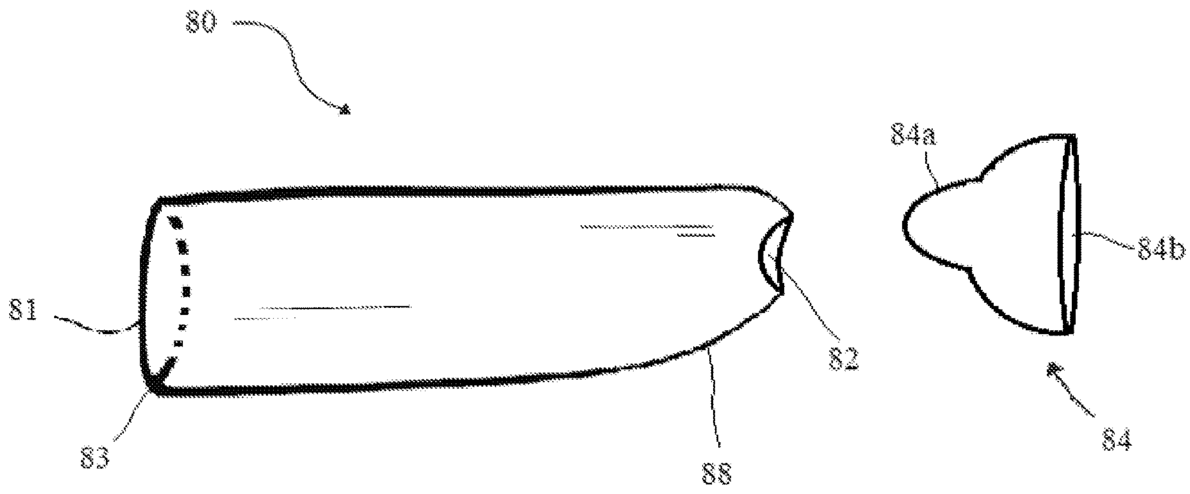
FIG. 8 is a side view of a finger sleeve in accordance with another embodiment having a distal region configured to mate with a medical device.

While the embodiments discussed above are directed to a sexual stimulation device, FIG. 8 illustrates an embodiment of a finger sleeve 80 for use in a medical setting. Finger sleeve 80 allows for individuals with protruding natural or artificial fingernails to easily position medical devices in body orifices easily without causing damage to surrounding body tissue. The finger sleeve 80 includes a proximal end 83 and a distal end 88. The proximal end includes an opening 81 for receiving a user's finger and also includes a barrier (not shown) and a fingernail cavity (not shown) substantially similar to the fingernail cavity 18 described above. The distal end 88 includes a feature 82 for removably connecting to a medical device 84, for example by friction or press fit. In one aspect, the medical device 84 may include a diaphragm or cervical menstrual cup. The medical device 84 may include a distal cup **84*b* configured to surround a cervix and a proximal feature 84*a* configured for engagement with feature 82. In use, a user having a protruding fingernail can insert a figure into finger sleeve 80, abutting the tip of the finger against the barrier, and securing the fingernail within the fingernail cavity. The user can connect the feature 82 to the proximal feature 84*a* and then proceed to insert the medical device into the appropriate position within a body orifice. In some embodiments, the medical device 84 may be configured to receive a sample from a cervix or other body tissue. In other embodiments, feature 82 may include a surface configured for obtaining a body tissue or cell sample. For example, feature 82 may be configured as a recess, a pad, a brush, or a scraper to trap or collect cells when moved along a tissue surface. In other embodiments, feature 82** may include a pad with a reagent to change color when exposed to a desired analyte or fluid.

In using any of the finger sleeves described above, the finger sleeve is worn on the finger of a user having a fingernail protruding over the forward edge of a fingertip that is going to engage in sexual penetration. Sexual penetration can include masturbation or digital manipulation with a partner, and can include penetration within or around a body orifice such as a vagina, anus, or mouth. When a user engages in sexual penetration wearing the finger sleeve, the user's protruding fingernail is encased, secured, and protected. Without the present invention, if a user with a protruding fingernail desires to engage in sexual penetration, there is a risk of jamming or damaging the user's protruding fingernail which can be painful and unsanitary for the user and/or a partner whilst trying to experience sexual pleasure.

When a user engages in sexual penetration wearing a finger sleeve, the recipient of the sexual penetration is protected by the external layer of the finger sleeve and the barrier that sustains the figure of the finger sleeve. Stimulation elements, ridges, bumps, recesses, or other features increase sexual pleasure during use. Without the present invention, bodily tissues involved in sexual penetration can easily be harmed by edges of the protruding fingernail, including both natural and artificial, where the user and/or partner experience discomfort whilst trying to experience sexual pleasure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above described elements in all possible variations thereof is encompassed by the disclosure unless otherwise indicated herein or otherwise clearly contradicted by context.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "approximately" includes within 1, 2, 3, or 4 standard deviations. In certain embodiments, the term "about" or "approximately" means within 50%, 20%, 15%, %, 9%, 8%, 7%, 6%, 5%, 4%, 3%, 2%, 1%, 0.5%, or 0.05% of a given value or range. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

What is claimed is:

1. A finger sleeve, comprising:

a body having, a canal for holding a finger, the canal having an opening at one end and a head at a second end opposite of the opening;

a solid barrier located at the second end of the canal, the solid barrier being configured to meet a tip of the finger as an abutment to confine the finger inside the canal; and a fingernail cavity extending from the canal over the solid barrier to hold a protruding fingernail of the finger, the solid barrier including a surface with a shape that supports a structure of the canal and the fingernail cavity, the barrier being integral to the shape and size of the fingernail cavity; and an external layer encasing the body, the canal, the solid barrier and the fingernail cavity.

2. The finger sleeve of claim 1, wherein the shape of the surface of the solid barrier includes one or more arches and is configured to contact the tip of the finger.

3. The finger sleeve of claim 1, wherein the external layer forms a wall of the canal or is an additional layer of material surrounding the canal.

4. The finger sleeve of claim 3, further comprising:

one or more protrusions, textures, or perforations on the external layer.

5. The finger sleeve of claim 1, wherein the canal, solid barrier, and fingernail cavity are formed of silicone.

6. The finger sleeve of claim 1, wherein the canal is configured to grip the finger so as to remain stationary during movement of sexual penetration.

7. The finger sleeve of claim 1, wherein the finger sleeve is clear.

8. The finger sleeve of claim 1, wherein the finger sleeve is colored.

9. The finger sleeve of claim 1, wherein the finger sleeve is glow in the dark.

10. A sexual aid device, comprising:

an elongated body having an outer surface, a proximal end, a distal end, and a longitudinal axis extending from the proximal end to the distal end;

an opening at the proximal end configured to accept a finger;

an abutment located at the distal end configured to abut a tip of the finger to confine the finger inside the elongated body, the abutment including a surface with a shape that supports a structure of the elongated body and a recess;

a recess configured to receive a protruding fingernail, the recess being offset from the longitudinal axis and extending over the abutment, the abutment being integral to a shape and size of the recess; and an external layer encasing the elongated body, the abutment, and the recess.

11. The sexual aid device of claim 10, further comprising one or more projections, protrusions, knobs, bumps, rings, perforations, recesses, or textures.

12. The sexual aid device of claim 10, wherein a diameter of the elongated body is in the range of 1 cm to 3 cm.

13. The sexual aid device of claim 10, wherein the elongated body has a length from the proximal end to the distal end in a range of 5 cm-15 cm.

14. The sexual aid device of claim 10, wherein the recess has a length of 1 cm to 4 cm.

15. The sexual aid device of claim 10, further comprising:

a power source; and a switch to control a stimulation element, wherein the stimulation element is one of a vibratory device, a heat generating device, or a sound output device.

16. The sexual aid device of claim 10, wherein the outer surface of the elongated body has a first diameter at one location and a second diameter at a second location, the second diameter being different than the first diameter.

17. The sexual aid device of claim 10, wherein the elongated body is formed of silicone.

18. The sexual aid device of claim 10, wherein the elongated body is flexible.

19. The sexual aid device of claim 10, wherein elongated body has a first flexible portion and a second rigid portion.

20. A method of sexual penetration, comprising:

inserting a finger into a sleeve having a canal for holding the finger, the canal having an opening at one end and a head at a second end opposite of the opening;

contacting a barrier located at the second end of the canal with a tip of the finger to confine the finger inside the canal, the barrier including a surface with a shape that supports a structure of the canal and a fingernail recess;

placing a fingernail protruding beyond the tip of the finger in a fingernail recess, the fingernail recess extending from the canal over the barrier, the barrier being integral to a shape and size of the fingernail recess; and inserting the sleeve into a body orifice, wherein the sleeve includes an external layer encasing the canal, the barrier, and the fingernail recess.

* * * * *